US011728889B2

(12) United States Patent
Sasai et al.

(10) Patent No.: US 11,728,889 B2
(45) Date of Patent: Aug. 15, 2023

(54) OPTICAL TRANSMITTING APPARATUS AND TRANSMISSION CHARACTERISTICS ESTIMATION METHOD

(71) Applicant: NIPPON TELEGRAPH AND TELEPHONE CORPORATION, Tokyo (JP)

(72) Inventors: Takeo Sasai, Musashino (JP); Fukutaro Hamaoka, Musashino (JP); Masanori Nakamura, Musashino (JP); Seiji Okamoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/782,957

(22) PCT Filed: Dec. 16, 2019

(86) PCT No.: PCT/JP2019/049232
§ 371 (c)(1),
(2) Date: Jun. 6, 2022

(87) PCT Pub. No.: WO2021/124415
PCT Pub. Date: Jun. 24, 2021

(65) Prior Publication Data
US 2022/0416890 A1    Dec. 29, 2022

(51) Int. Cl.
*H04B 10/2543* (2013.01)
*H04B 10/61* (2013.01)

(52) U.S. Cl.
CPC ..... *H04B 10/2543* (2013.01); *H04B 10/6161* (2013.01)

(58) Field of Classification Search
None
See application file for complete search history.

(56) References Cited

U.S. PATENT DOCUMENTS 4,628,278 A * 12/1986 Bottman ............. H03F 1/32
330/144
2006/0197577 A1 * 9/2006 Mukherjee ........... H03F 3/08
327/317
(Continued)

FOREIGN PATENT DOCUMENTS

JP          2014195149 A    10/2014
WO     WO-2017217217 A1    12/2017

OTHER PUBLICATIONS

M. K. Barnoski and S. M. Jensen, Fiber waveguides: a novel technique for investigating attenuation characteristics, Applied Optics, vol. 15, No. 9, 1976, pp. 2112-2115.
(Continued)

*Primary Examiner* — Darren E Wolf
(74) *Attorney, Agent, or Firm* — Harness, Dickey & Pierce, P.L.C.

(57) ABSTRACT

An optical reception device includes a coefficient update section which optimizes a dispersion coefficient used in compensation of wavelength dispersion of a received signal obtained by receiving an optical signal according to a coherent detection method and a phase rotation amount used in compensation of a nonlinear optical effect of the received signal, and a transmission characteristic estimation section which estimates a transmission characteristic of a transmission line by using the optimized dispersion coefficient and the optimized phase rotation amount.

8 Claims, 9 Drawing Sheets

(56) References Cited

U.S. PATENT DOCUMENTS

| | | | | |
|---|---|---|---|---|
| 2014/0273889 | A1* | 9/2014 | Manku | H04B 1/44 |
| | | | | 455/79 |
| 2014/0292406 | A1* | 10/2014 | Dechen | H03F 1/3247 |
| | | | | 330/149 |
| 2018/0302168 | A1* | 10/2018 | Morero | H04L 25/067 |
| 2018/0337641 | A1* | 11/2018 | Prentice | H04B 10/25754 |
| 2019/0074903 | A1* | 3/2019 | Takamuku | H04B 10/2507 |

OTHER PUBLICATIONS

Shin-ichi Furukawa et al., Enhanced Coherent OTDR for Long Span Optical Transmission Lines Containing Optical Fiber Amplifiers, IEEE Photonics Technology Letters, vol. 7, No. 5, 1995, pp. 540-542.

* cited by examiner

Fig. 9
FIG. 9A
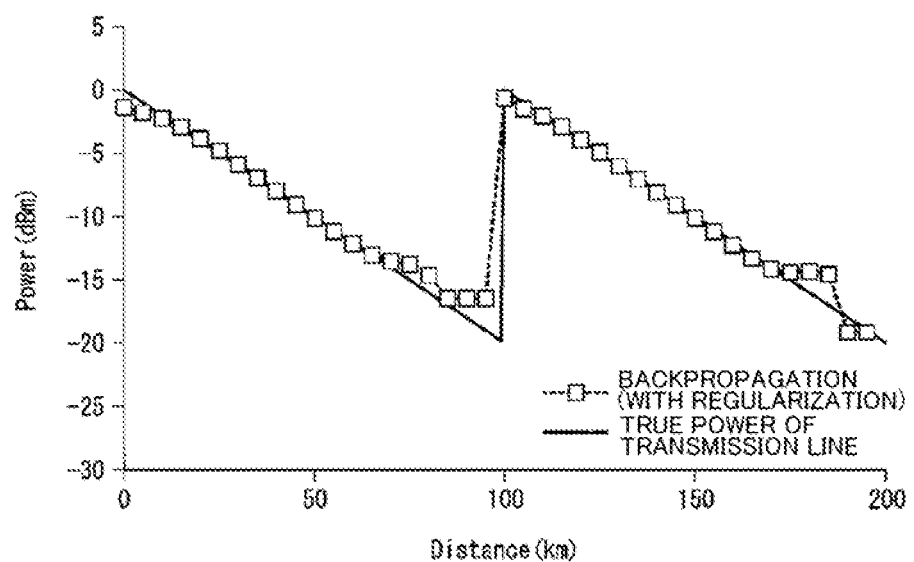
FIG. 9B
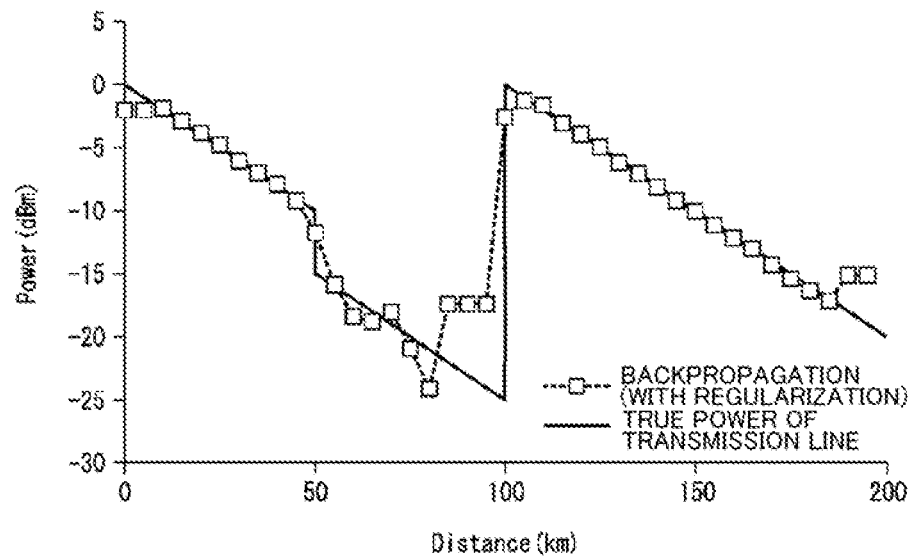

OPTICAL TRANSMITTING APPARATUS AND TRANSMISSION CHARACTERISTICS ESTIMATION METHOD

CROSS-REFERENCE TO RELATED APPLICATIONS

This application is a 371 U.S. National Phase of International Application No. PCT/JP2019/049232, filed on Dec. 16, 2019. The entire disclosure of the above application is incorporated herein by reference.

TECHNICAL FIELD

The present invention relates to an optical reception device and a transmission characteristic estimation method.

BACKGROUND ART

Conventionally, in order to perform maintenance and monitoring of an optical transmission line, a technique for allowing remote diagnosis of characteristics of the optical transmission line (a loss distribution, a position of a failure point, or the like) is studied. As such a technique, OTDR (Optical Time Domain Reflectometer) is known as a representative technique (see, e.g., NPL 2). The OTDR is a technique for measuring the loss distribution in an optical fiber by emitting an optical pulse into the optical fiber and obtaining power of return light.

CITATION LIST

Non Patent Literature

[NPL 1] M. K. Barnoski et al., "Fiber waveguides: a novel technique for investigating attenuation characteristics," Applied Optics, 15(9), pp. 2112-2115, 1976.
[NPL 2] S. Furukawa et al., "Enhanced Coherent OTDR for Long Span Optical Transmission Lines Containing Optical Fiber Amplifiers," IEEE Photon. Technol. Lett., 7(5), pp. 540-542, 1995.

SUMMARY OF THE INVENTION

Technical Problem

However, the OTDR has a plurality of problems described below. The first problem is that a special device for performing the OTDR is required, and hence cost is increased. The second problem is that an engineer who knows a method for using the special device needs to go to a job site, and hence the operation cost of personnel is required. The third problem is that an optical amplifier permits passage of light only in a forward direction, and hence, in the case where diagnosis of a transmission line beyond the optical amplifier is performed, separate (two) transmission lines are required for outward travel and return travel of the optical pulse (see, e.g., NPL 2).

As described above, in the case where the OTDR is used, a problem arises in that it is not possible to easily estimate optical transmission characteristics. Such a problem is not limited to the case where the OTDR is used, but is a problem common to all diagnosis methods which require a special device for diagnosis of optical transmission characteristics.

In view of the above circumstances, an object of the present invention is to provide a technique for allowing optical transmission characteristics to be estimated easily.

Means for Solving the Problem

An aspect of the present invention is an optical reception device including: a coefficient update section which optimizes a dispersion coefficient used in compensation of wavelength dispersion of a received signal obtained by receiving an optical signal according to a coherent detection method and a phase rotation amount used in compensation of a nonlinear optical effect of the received signal; and a transmission characteristic estimation section which estimates a transmission characteristic of a transmission line by using the optimized dispersion coefficient and the optimized phase rotation amount.

An aspect of the present invention is a transmission characteristic estimation method including: a coefficient update step of optimizing a dispersion coefficient used in compensation of wavelength dispersion of a received signal obtained by receiving an optical signal according to a coherent detection method and a phase rotation amount used in compensation of a nonlinear optical effect of the received signal; and a transmission characteristic estimation step of estimating a transmission characteristic of a transmission line by using the optimized dispersion coefficient and the optimized phase rotation amount.

Effects of the Invention

According to the present invention, it becomes possible to easily estimate optical transmission characteristics.

BRIEF DESCRIPTION OF DRAWINGS

FIG. 9A is a view showing a simulation result in the case where a failure point is not present.
FIG. 9B is a view showing a simulation result in the case where the failure point is present.

DESCRIPTION OF EMBODIMENTS

Figure 1:
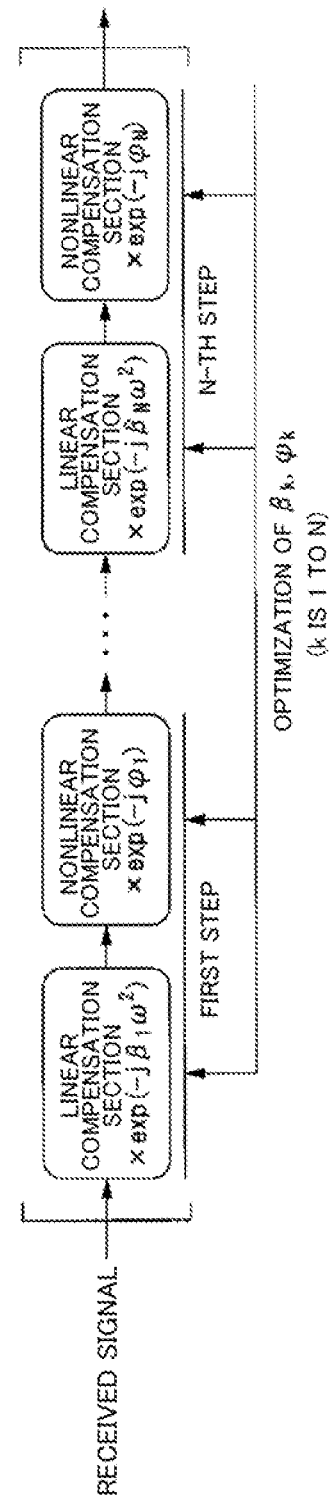
FIG. 1 is a view for explaining the outline of the present invention.

Hereinbelow, embodiments of the present invention will be described with reference to the drawings.
FIG. 1 is a view for explaining the outline of the present invention.
In the present invention, similarly to conventional digital back propagation (DBP), a set of a linear compensation section and a nonlinear compensation section is executed N (N is an integer of at least 1) step(s). Further, in the present invention, optical transmission characteristics are diagnosed by optimizing a dispersion coefficient $\beta_k$ of each linear compensation section and a phase rotation amount $\phi_k$ of each nonlinear compensation section such that, e.g., an SNR (Signal-to-Noise ratio) of a signal is maximized. Herein, optical transmission characteristics include a loss distribution and a dispersion distribution. The loss distribution is a distribution which shows the phase rotation amount $\phi_k$ corresponding to a position in a fiber longitudinal direction. The dispersion distribution is a distribution which shows the dispersion coefficient $\beta_k$ indicative of a dispersion amount corresponding to the position in the fiber longitudinal direction.

In the configuration of the digital back propagation, if the inverse of a nonlinear phase rotation amount occurring in an optical transmission line can be imparted to a received signal, it is possible to increase the SNR of the signal. Accordingly, in an aspect of the present invention, optimization of an inverse phase rotation amount $\phi_k$ is performed such that the SNR of the signal is maximized. With this, it is possible to estimate a nonlinear rotation amount in the transmission line and, as a result, it becomes possible to estimate optical power. In an aspect of the present invention, the optimized phase rotation amount $\phi_k$ is the phase rotation amount to be determined (the nonlinear rotation amount mentioned above). In addition, in the configuration of the digital back propagation, if the inverse of the dispersion amount occurring in the optical transmission line can be imparted to the received signal, it is possible to increase the SNR of the signal. Accordingly, in an aspect of the present invention, optimization of an inverse dispersion coefficient $\beta_k$ is performed such that the SNR of the signal is maximized. With this, it is possible to estimate the dispersion amount in the transmission line. In an aspect of the present invention, the optimized dispersion coefficient $\beta_k$ is the dispersion coefficient to be determined (the dispersion amount mentioned above).

In the present invention, the diagnosis of optical transmission characteristics is allowed by estimating the nonlinear rotation amount and the dispersion amount in the transmission line in the manner described above.

Hereinbelow, a specific configuration will be described.

First Embodiment

Figure 2:
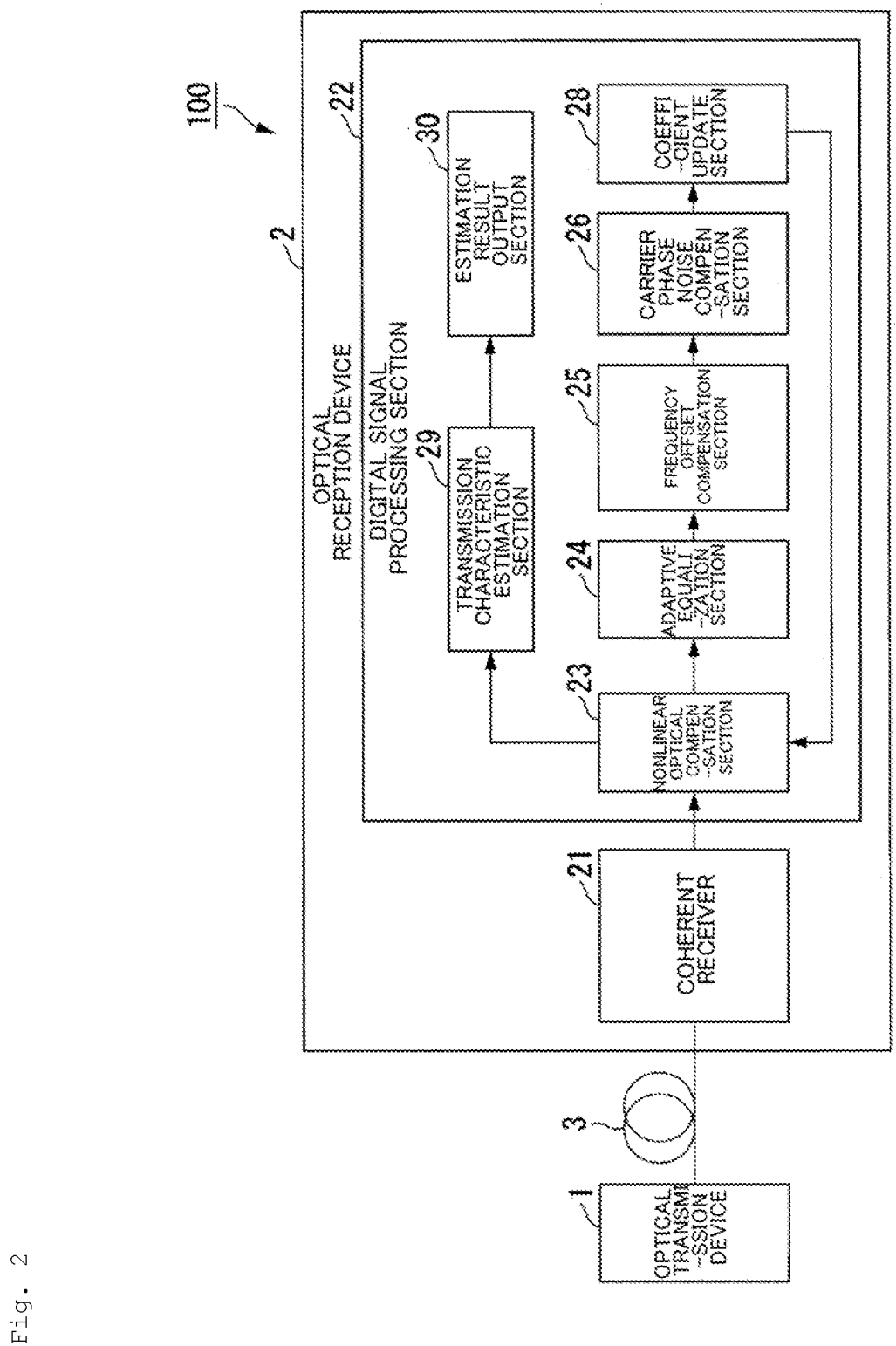
FIG. 2 is a view showing the system configuration of an optical transmission system in a first embodiment.

FIG. 2 is a view showing the system configuration of an optical transmission system 100 in a first embodiment. The optical transmission system 100 includes an optical transmission device 1 and an optical reception device 2. The optical transmission device 1 and the optical reception device 2 are connected to each other so as to be able to communicate with each other via an optical transmission line 3. The optical transmission line 3 transmits an optical signal transmitted by the optical transmission device 1 to the optical reception device 2. The optical transmission line 3 is constituted by an optical fiber which connects the optical transmission device 1 and the optical reception device 2.

The optical transmission device 1 encodes transmission information given from an external information source to generate an electrical signal, converts the generated electrical signal to an optical signal, and transmits the optical signal to the optical reception device 2 via the optical transmission line 3.

The optical reception device 2 includes a coherent receiver 21 and a digital signal processing section 22.

The coherent receiver 21 separates a baseband optical signal into two optical signals of which polarization planes are orthogonal to each other. The optical signals and local light of a local light source (not shown) are input to a 90° hybrid circuit (not shown), and four output lights including a pair of output lights which are caused to interfere with each other in the same phase and opposite phases and a pair of output lights which are caused to interfere with each other orthogonally (90°) and inverse-orthogonally (−90°) are obtained. These four output lights are converted to analog signals by a photodiode (not shown). The coherent receiver 11 converts each of these four analog signals to digital signals.

When the optical signal propagates in the optical transmission line 3, a signal waveform is distorted due to a nonlinear optical effect in which the phase of the signal rotates in proportion to optical power of the signal. The digital signal processing section 22 captures the digital signal output by the coherent receiver 21 as the received signal, and performs nonlinear optical compensation on the captured received signal.

The digital signal processing section 22 includes a nonlinear optical compensation section 23, an adaptive equalization section 24, a frequency offset compensation section 25, a carrier phase noise compensation section 26, a coefficient update section 28, a transmission characteristic estimation section 29, and an estimation result output section 30.

Figure 3:
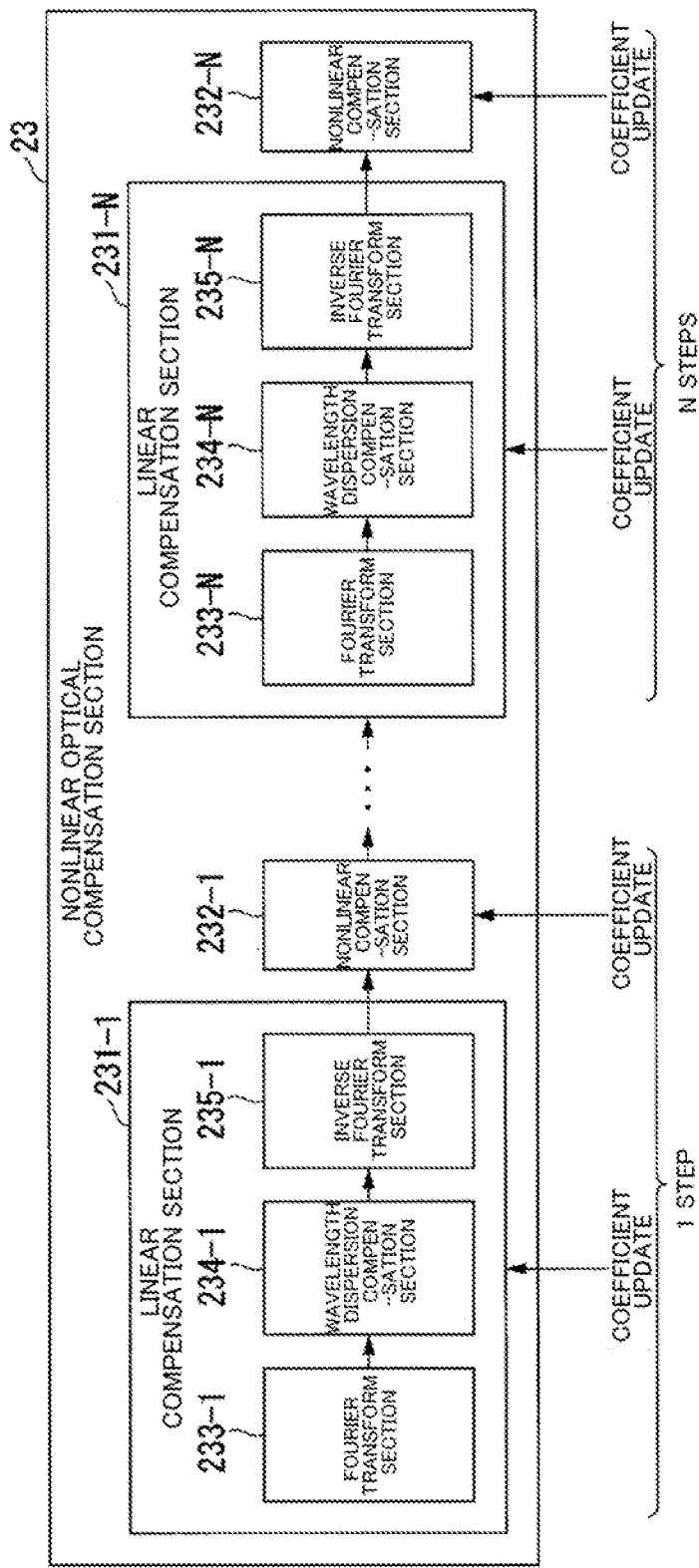
FIG. 3 is a schematic block diagram showing the functional configuration of a nonlinear optical compensation section in the first embodiment.

The nonlinear optical compensation section 23 has a configuration shown in FIG. 3, and performs the nonlinear optical compensation on each of the four digital signals.

FIG. 3 is a schematic block diagram showing the functional configuration of the nonlinear optical compensation section 23 in the first embodiment.

The nonlinear optical compensation section 23 includes a plurality of linear compensation sections 231-1 to 231-N and a plurality of nonlinear compensation sections 232-1 to 232-N. One linear compensation section 231 and one nonlinear compensation section 232 constitute one set which performs linear compensation and nonlinear compensation, and the nonlinear optical compensation section 23 includes N sets in order to perform the processing by the set N step(s).

The linear compensation section 231-1 includes a Fourier transform section 233-1, a wavelength dispersion compensation section 234-1, and an inverse Fourier transform section 235-1.

The Fourier transform section 233-1 performs FFT on a received signal in a time domain to thereby transform the received signal in the time domain into a received signal in a frequency domain.

The wavelength dispersion compensation section 234-1 performs wavelength dispersion compensation by multiplying the received signal in the frequency domain by a predetermined value (e.g., $\exp\hat{}(-j\beta_k\omega^2)$). Note that the sign "$\hat{}$" means that a value subsequent to "$\hat{}$" is a superscript of exp. For example, in the case of $\exp\hat{}(-j\beta_k\omega^2)$, "$\hat{}$" means that $(-j\beta_k\omega^2)$ is a superscript of exp. The meaning of "$\hat{}$" applies to the subsequent description. The wavelength dispersion compensation section 234-1 performs the wavelength dispersion compensation by using the dispersion coefficient $\beta_k$ which is set as an initial value when processing is started, and performs the wavelength dispersion compensation by using the updated dispersion coefficient $\beta_k$ every time the dispersion coefficient $\beta_k$ is updated by the coefficient update section 28.

The inverse Fourier transform section 235-1 performs IFFT on a signal output from the wavelength dispersion compensation section 234-1 to thereby transform the received signal having been subjected to the wavelength dispersion compensation into a received signal in the time domain.

The nonlinear optical compensation section 23 performs compensation of the nonlinear optical effect by multiplying a series of signals output from the inverse Fourier transform section 235 by a predetermined value (e.g., $\exp\hat{}(-j\phi_k)$). Specifically, the nonlinear optical compensation section 23 performs the compensation of the nonlinear optical effect by using the phase rotation amount $\phi_k$ which is set as an initial value when processing is started, and performs the compensation of the nonlinear optical effect by using the updated phase rotation amount $\phi_k$ every time the phase rotation amount $\phi_k$ is updated by the coefficient update section 28.

The linear compensation section 231-N performs the same processing as that of the linear compensation section 231-1. In addition, the nonlinear compensation section 232-N performs the same processing as that of the nonlinear compensation section 232-1.

Returning to FIG. 2, the description of the optical reception device 2 will be continued.

The adaptive equalization section 24 is a functional section which compensates for the distortion generated in the waveform of the optical signal in the optical transmission line 3. That is, the adaptive equalization section 24 is a functional section which corrects a code error caused in the optical signal by inter-code interference (intersymbol interference) in the optical transmission line 3. The adaptive equalization section 24 executes adaptive equalization processing with an FIR filter (finite impulse response filter) according to a set tap coefficient.

The frequency offset compensation section 25 executes processing for compensating for a frequency offset on four digital signals on which the adaptive equalization processing has been executed.

The carrier phase noise compensation section 26 executes processing for compensating for a phase offset on the four digital signals of which the frequency offsets have been subjected to the compensation.

The coefficient update section 28 updates all coefficients (e.g., the dispersion coefficients $\beta_k$, the phase rotation amounts $\phi_k$, and the like) used in the nonlinear optical compensation section 23 in all steps. In the first embodiment, for example, the coefficient update section 28 updates all coefficients (e.g., the dispersion coefficients $\beta_k$, the phase rotation amounts $\phi_k$, and the like) used in the nonlinear optical compensation section 23 in all steps based on an output signal from the carrier phase noise compensation section 26 and a training signal. The coefficient update section 28 sets the updated coefficients in the individual functional sections of the nonlinear optical compensation section 23. The training signal compared with the output signal in the first embodiment is a transmission signal converted into an electrical signal.

The transmission characteristic estimation section 29 estimates transmission characteristics of the optical transmission line 3. For example, the transmission characteristic estimation section 29 estimates the loss distribution by using the optimized phase rotation amounts $\phi_k$. In addition, for example, the transmission characteristic estimation section 29 estimates the dispersion distribution by using the optimized dispersion coefficients $\beta_k$.

The estimation result output section 30 outputs the loss distribution and the dispersion distribution estimated by the transmission characteristic estimation section 29 to the outside.

Figure 4:
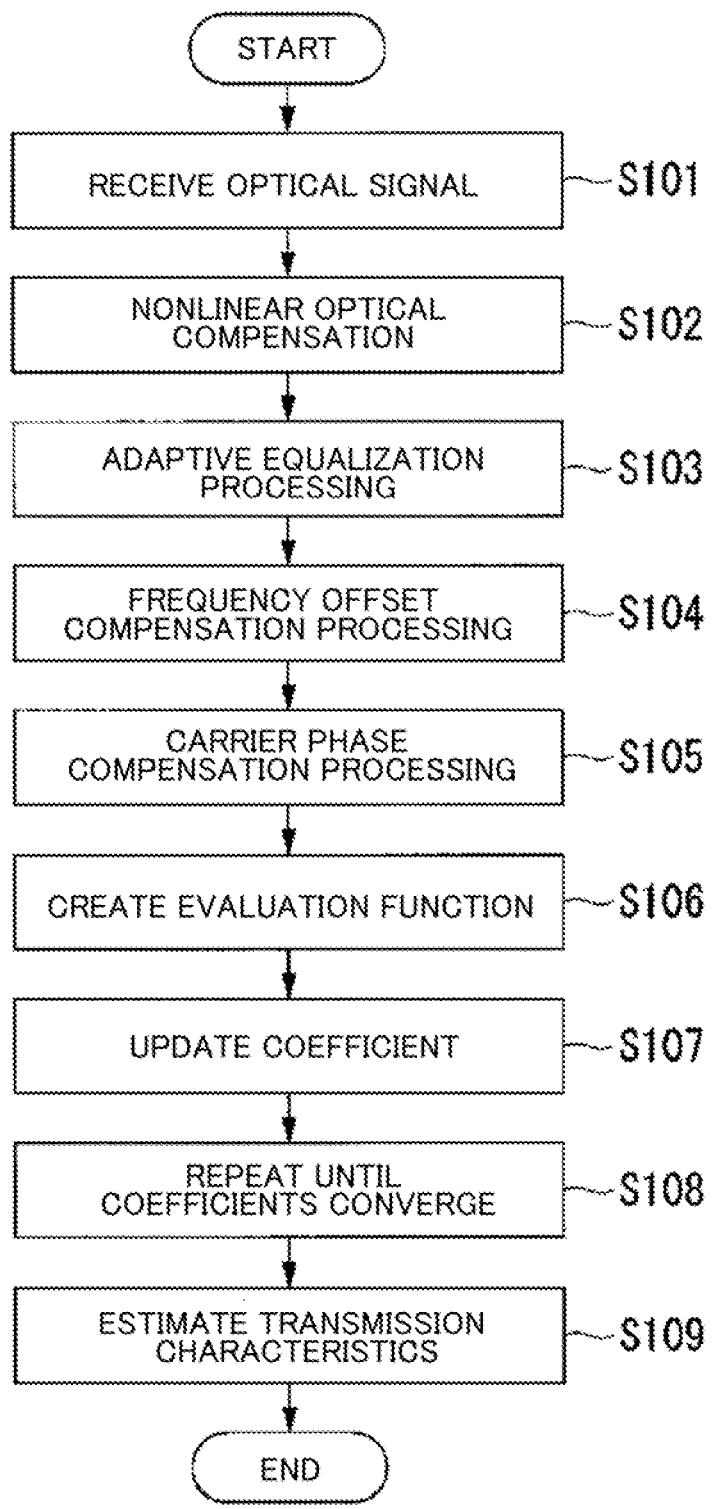
FIG. 4 is a flowchart showing the procedure of transmission characteristic estimation processing by an optical reception device in the first embodiment.

FIG. 4 is a flowchart showing the procedure of transmission characteristic estimation processing by the optical reception device 2 in the first embodiment.

First, an initial setting before the processing in FIG. 4 is started will be described.

In the initial setting, compensation coefficients described below are estimated in advance and set. Herein, the compensation coefficients denote compensation coefficients used in the functional sections other than the nonlinear optical compensation section 23 of the digital signal processing section 22 such as, e.g., the adaptive equalization section 24, the frequency offset compensation section 25, and the carrier phase noise compensation section 26. Note that, as a method of the estimation, conventional techniques may be used. Next, appropriate initial values are set as all coefficients (e.g., the dispersion coefficients $\beta_k$, the phase rotation amounts $\phi_k$, and the like) used in the nonlinear optical compensation section 23. Note that the initial values of all coefficients used in the nonlinear optical compensation section 23 are any values. For example, the initial value may be set to 0 and, in the case of input power such as the phase rotation amount $\phi_k$ (the dispersion coefficient $\beta_k$) of which the value is already determined, the value may be used as the initial value of the phase rotation amount $\phi_k$. The above description corresponds to the initial setting.

When the initial setting is completed, the coherent receiver 21 of the optical reception device 2 receives the optical signal transmitted from the optical transmission device 1 (Step S101). The coherent receiver 21 converts the received optical signal to the digital signal, and outputs the digital signal to the digital signal processing section 22. The nonlinear optical compensation section 23 performs the nonlinear optical compensation on each digital signal output from the coherent receiver 21 (Step S102). Specifically, the Fourier transform section 233-1 performs the FFT on the received signal in the time domain to thereby transform the received signal in the time domain into the received signal in the frequency domain. The Fourier transform section 233-1 outputs the received signal transformed into the received signal in the frequency domain to the wavelength dispersion compensation section 234-1.

The wavelength dispersion compensation section 234-1 performs the wavelength dispersion compensation on the received signal in the frequency domain. At this point, the wavelength dispersion compensation section 234-1 uses the dispersion coefficient $\beta_k$ set as the initial value. The wavelength dispersion compensation section 234-1 outputs the received signal having been subjected to the wavelength dispersion compensation to the inverse Fourier transform section 235-1. The inverse Fourier transform section 235-1 performs the IFFT on the signal output from the wavelength dispersion compensation section 234-1 to thereby transform the received signal having been subjected to the wavelength dispersion compensation into the received signal in the time domain.

The inverse Fourier transform section 235-1 outputs the received signal transformed into the received signal in the time domain to the nonlinear compensation section 232-1. The nonlinear compensation section 232-1 performs the compensation of the nonlinear optical effect on the received signal transformed into the received signal in the time domain. At this point, the nonlinear compensation section 232-1 uses the phase rotation amount $\phi_k$ set as the initial value. The nonlinear compensation section 232-1 outputs the received signal having been subjected to the compensation of the nonlinear optical effect to the Fourier transform section 233 in the subsequent stage.

When the processing in Step S102 descried above is executed the number of times corresponding to N steps, the adaptive equalization section 24 executes the adaptive equalization processing for compensating for the distortion generated in the waveform of the output signal output from the nonlinear optical compensation section 23 (Step S103). Note that the method of the adaptive equalization processing is the same as the conventional method, and hence the description thereof will be omitted. The adaptive equalization section 24 outputs the signal having been subjected to the adaptive equalization processing to the frequency offset compensation section 25.

The frequency offset compensation section 25 executes the frequency offset compensation processing for compensating for the frequency offset on the signal output from the adaptive equalization section 24 (Step S104). Note that the method of the frequency offset compensation processing is the same as the conventional method, and hence the description thereof will be omitted. The frequency offset compensation section 25 outputs the signal having been subjected to the frequency offset compensation processing to the carrier phase noise compensation section 26.

The carrier phase noise compensation section 26 executes the carrier phase compensation processing for compensating for the phase offset on the digital signal of which the frequency offset has been subjected to the compensation (Step S105). Note that the method of the carrier phase compensation processing is the same as the conventional method, and hence the description thereof will be omitted. The carrier phase noise compensation section 26 outputs the signal having been subjected to the carrier phase compensation processing to the coefficient update section 28.

The coefficient update section 28 compares the output signal output from the carrier phase noise compensation section 26 with the training signal which is obtained in advance, and creates a predetermined evaluation function (Step S106). As the evaluation function, any evaluation function may be used. For example, as the evaluation function, the residual sum of squares shown in the following Formula (1) or a formula in which a regularization term is added to the residual sum of squares shown in the following Formula (2) may be used.

[Math. 1]
$$J = \frac{1}{2}\sum_{i}|x_i - t_i|^2 \quad (1)$$

[Math. 2]
$$J = \frac{1}{2}\sum_{i}|x_i - t_i|^2 + \lambda\sum_{k}\log(\varphi_k - \varphi_{k+1}) \quad (2)$$

In Formula (1), J represents an evaluation function, xi represents a received signal of the i (i is an integer of at least 1)-th sample, and $t_i$ represents a correct signal of the i-th sample. In addition, in Formula (2), the second term of the right side is a regularization term. $\phi_k$ in the regularization term represents a nonlinear phase rotation amount of the k-th step. By adding the regularization term, it is possible to increase estimation accuracy of the loss (estimation) distribution. Note that the regularization term may be any function as long as the regularization term can increase the estimation accuracy of the loss distribution.

Next, the coefficient update section 28 updates all coefficients (e.g., the dispersion coefficients $\beta_k$, the phase rotation amounts $\phi_k$, and the like) used in the nonlinear optical compensation section 23 by using an optimization algorithm so as to minimize the created evaluation function (Step S107). As the optimization algorithm, a method in which the dispersion coefficients $\beta_k$ and the phase rotation amounts $\phi_k$ are optimized one by one, and existing methods which exist in the field of machine learning such as backpropagation and gradient descent may be used.

In the case where the method in which the dispersion coefficients $\beta_k$ and the phase rotation amounts $\phi_k$ are optimized one by one is used, the coefficient update section 28 performs steps of processing shown in the following (1) to (3).

(1) $\phi_1$ is optimized (other $\phi_k$ are fixed) such that the evaluation function is minimized.

(2) Similarly, $\phi_2$ to $\phi_N$ are optimized one by one.

(3) Optimization is performed from $\phi_2$ again, and the optimization is repeated until all coefficients $\phi_1$ to $\phi_N$ converge.

Note that the order of $\phi_k$ to be optimized may be any order. In addition, the coefficient update section 28 executes the above steps of processing (1) to (3) on the phase rotation amounts $\phi_k$.

In the case where the gradient descent is used, the coefficient update section 28 updates all coefficients (e.g., the dispersion coefficients $\beta_k$, the phase rotation amounts $\phi_k$, and the like) used in the nonlinear optical compensation section 23 based on the following Formula (3). The coefficient update section 28 can execute the update of all of the dispersion coefficients $\beta_k$ and all of the phase rotation amounts $\phi_k$ at the same time by using the gradient descent, and hence it is possible to reduce estimation time. Further, the estimation accuracy may be improved.

[Math. 3]
$$\varphi_k(t+1) = \varphi_k(t) - \mu\frac{\partial J}{\partial \varphi_k} \quad (3)$$
$$\beta_k(t+1) = \beta_k(t) - \mu\frac{\partial J}{\partial \beta_k}$$

In Formula (3), μ represents a step size. As shown in Formula (3), differential of the evaluation function J by $\beta_k$ and $\phi_k$ is required. Various methods for determining the differential are conceivable, and any method may be used. For example, the differential is calculated by using backpropagation (see, e.g., Reference Literature 1) or numerical differentiation which is often used in the field of machine learning.

(Reference Literature 1: R. P. Lippmann., "An introduction to computing with neural nets," IEEE ASSP Mag., 4(2)1987.)

The coefficient update section 28 sets the updated coefficients in the nonlinear optical compensation section 23. Thereafter, the optical reception device 2 repeatedly executes the processing in Step S102 to Step S107 by using the newly set coefficients until the values of the coefficients converge (Step S108).

Figure 5:
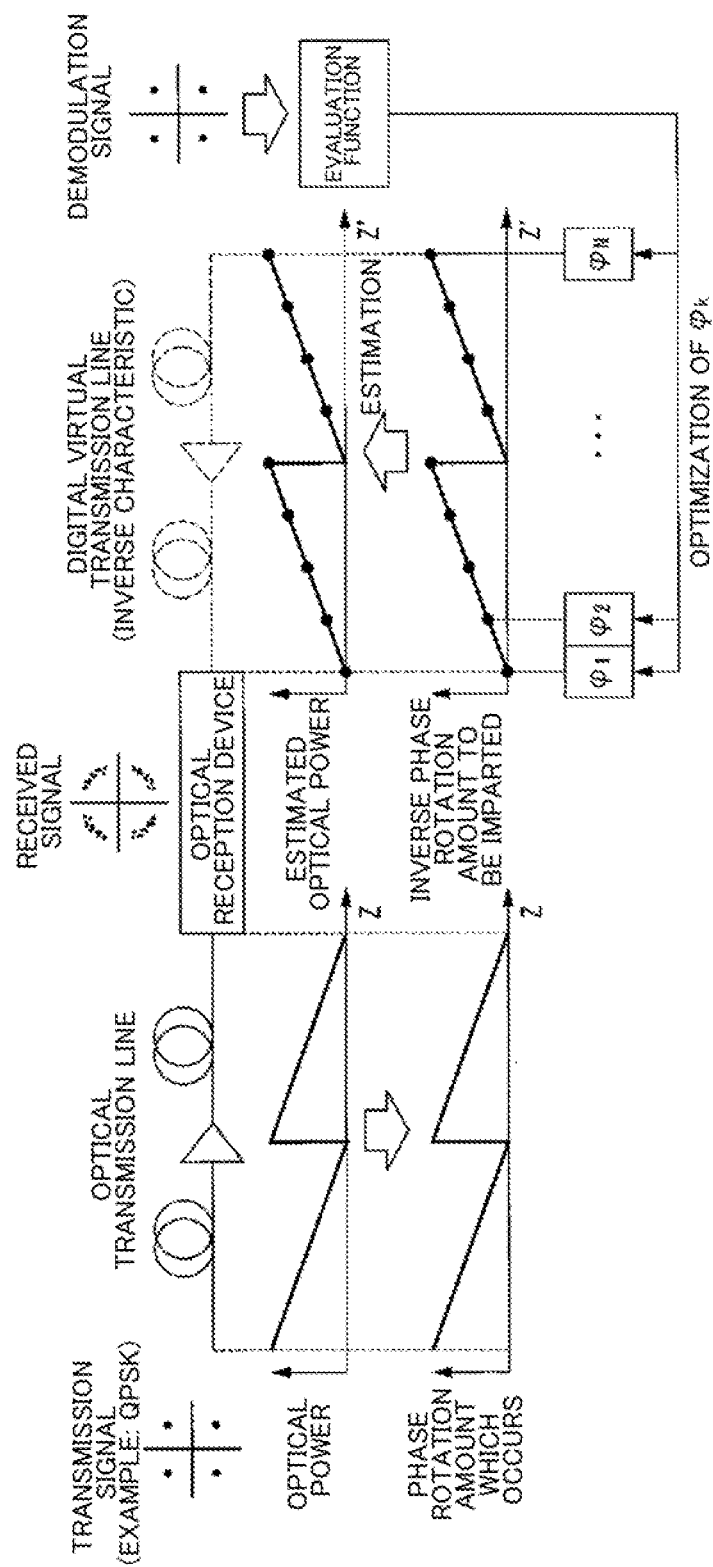
FIG. 5 is a view for explaining an implementation method of loss distribution estimation in the first embodiment.
Figure 6:
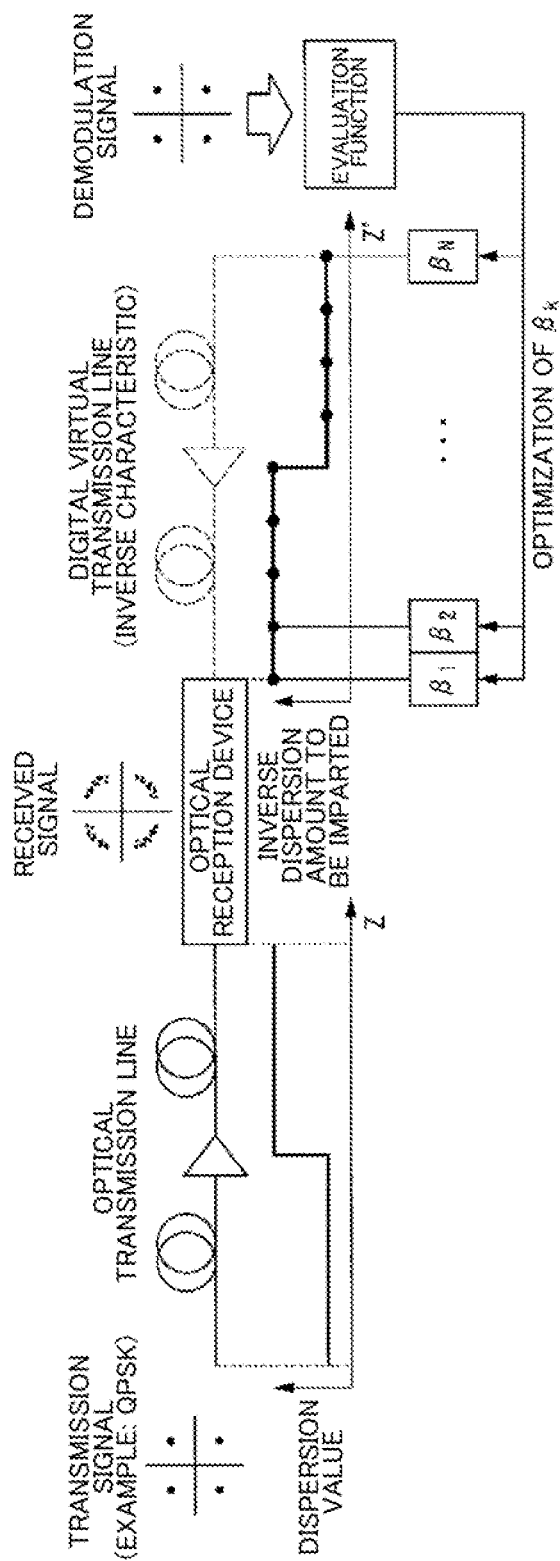
FIG. 6 is a view for explaining an implementation method of dispersion distribution estimation in the first embodiment.

The transmission characteristic estimation section 29 obtains all of the optimized coefficients (e.g., the dispersion coefficients $\beta_k$, the phase rotation amounts $\phi_k$, and the like). For example, the transmission characteristic estimation section 29 may obtain all of the optimized coefficients (e.g., the dispersion coefficients $\beta_k$, the phase rotation amounts $\phi_k$, and the like) from the nonlinear optical compensation section 23, or may also obtain them directly from the coefficient update section 28. The transmission characteristic estimation section 29 estimates transmission characteristics by using all of the obtained optimized coefficients (e.g., the dispersion coefficients $\beta_k$, the phase rotation amounts $\phi_k$, and the like) (Step S109). Specifically, the transmission characteristic estimation section 29 estimates the loss distribution by plotting all of the optimized phase rotation amounts $\phi_k$ (from $\phi_1$ to $\phi_N$), as shown in FIG. 5. In addition, the transmission characteristic estimation section 29 estimates the dispersion distribution by plotting all of the optimized dispersion coefficients $\beta_k$ (from $\beta_1$ to $\beta_N$), as shown in FIG. 6. Note that, in FIGS. 5 and 6, the horizontal axis Z indicates a distance. The transmission characteristic estimation section 29 outputs estimation results to the estimation result output section 30. The estimation result output section 30 outputs the estimation results (the loss distribution and the dispersion distribution) output from the transmission characteristic estimation section 29 to the outside.

According to the thus configured optical reception device 2, it is possible to estimate transmission characteristics in the optical reception device 2. Specifically, the optical reception device 2 optimizes the dispersion coefficients $\beta_k$ and the phase rotation amounts $\phi_k$ used at the time of the nonlinear optical compensation of the received signal. For example, the optical reception device 2 optimizes the dispersion coefficients $\beta_k$ and the phase rotation amounts $\phi_k$ used at the time of the nonlinear optical compensation of the received signal so as to maximize the SNR of the signal. With this, it becomes possible to estimate transmission characteristics indicative of the nonlinear rotation amount and the dispersion amount in the transmission line. In particular, a special device for OTDR or the like is not required in the optical reception device 2, and hence it is possible to reduce the cost of the device. In addition, in the optical reception device 2, it is possible to perform automatic diagnosis, and hence it is possible to reduce the operation cost of personnel which is required in the case where the conventional special device for the OTDR or the like is used. Further, in the optical reception device 2, it is possible to perform diagnosis without requiring a special configuration even in the case of the optical transmission line which extends over a plurality of optical amplifiers, and it is possible to remotely diagnose not only the loss distribution but also dispersion distribution. Thus, the optical reception device 2 allows optical transmission characteristics to be estimated easily.

Second Embodiment

In the first embodiment, the comparison between the received signal and the training signal is performed after the adaptive equalization processing, the compensation of the frequency offset, and the compensation of the phase offset. In a second embodiment, the comparison between the received signal and the training signal is performed between the nonlinear optical compensation section 23 and the adaptive equalization section 24.

Figure 7:
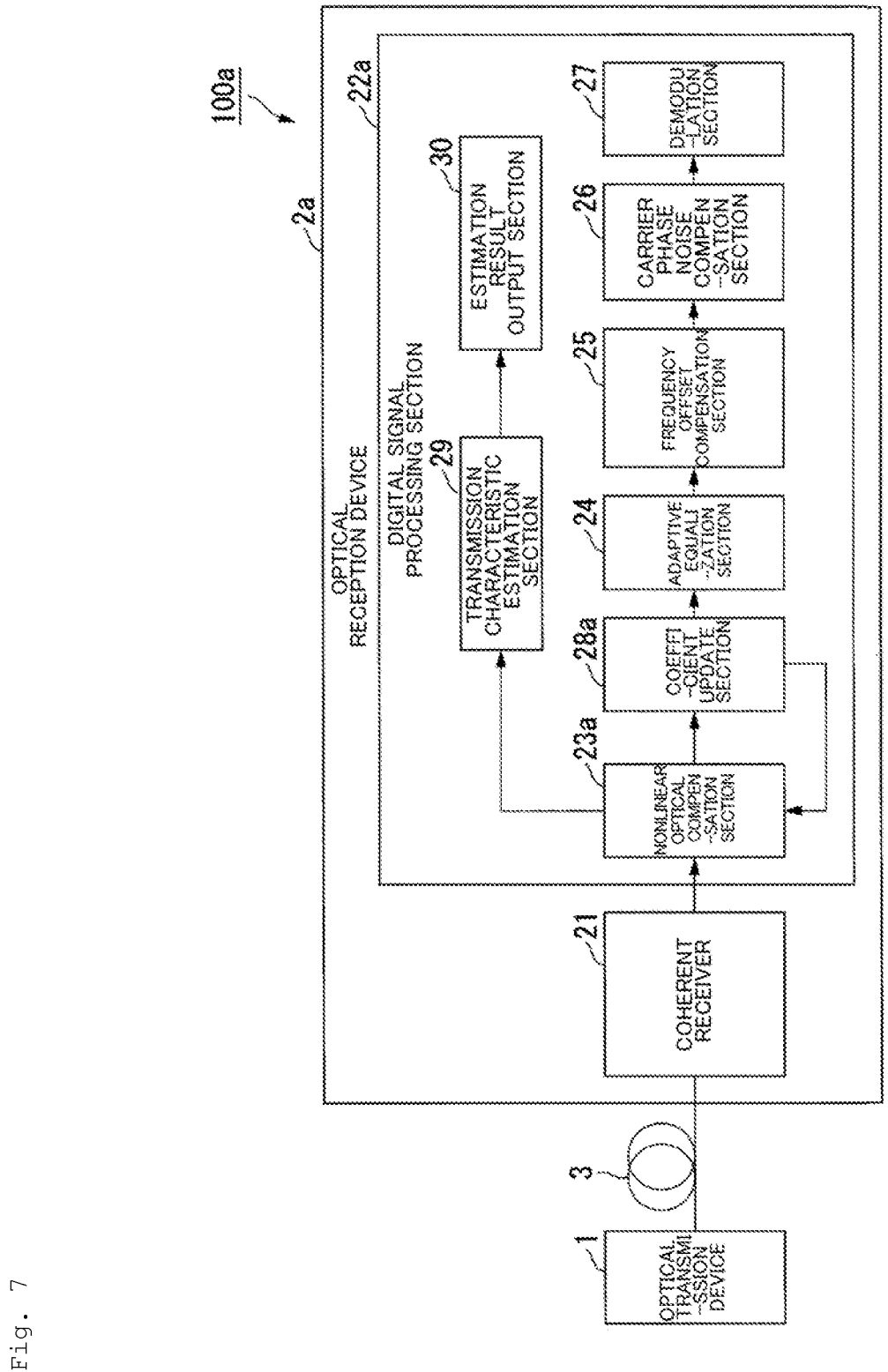
FIG. 7 is a view showing the system configuration of an optical transmission system in a second embodiment.

FIG. 7 is a view showing the system configuration of an optical transmission system 100a in the second embodiment.

The optical transmission system 100a is similar to that in the first embodiment except that the configuration of an optical reception device 2a is different. Hereinbelow, only points of difference will be described.

The optical reception device 2a includes the coherent receiver 21 and a digital signal processing section 22a. The digital signal processing section 22a includes the nonlinear optical compensation section 23a, the adaptive equalization section 24, the frequency offset compensation section 25, the carrier phase noise compensation section 26, the demodulation section 27, a coefficient update section 28a, a transmission characteristic estimation section 29, and an estimation result output section 30.

In the optical reception device 2a, the coefficient update section 28a is provided between the nonlinear optical compensation section 23a and the adaptive equalization section 24. Thus, the optical reception device 2a updates all coefficients (e.g., the dispersion coefficients $\beta_k$, the phase rotation amounts $\phi_k$, and the like) used in the nonlinear optical compensation section 23 in all steps by using the signal output from the nonlinear optical compensation section 23.

The demodulation section 27 performs demodulation and decoding on the four digital signals output from the carrier phase noise compensation section 26 to thereby obtain a demodulation signal.

Figure 8:
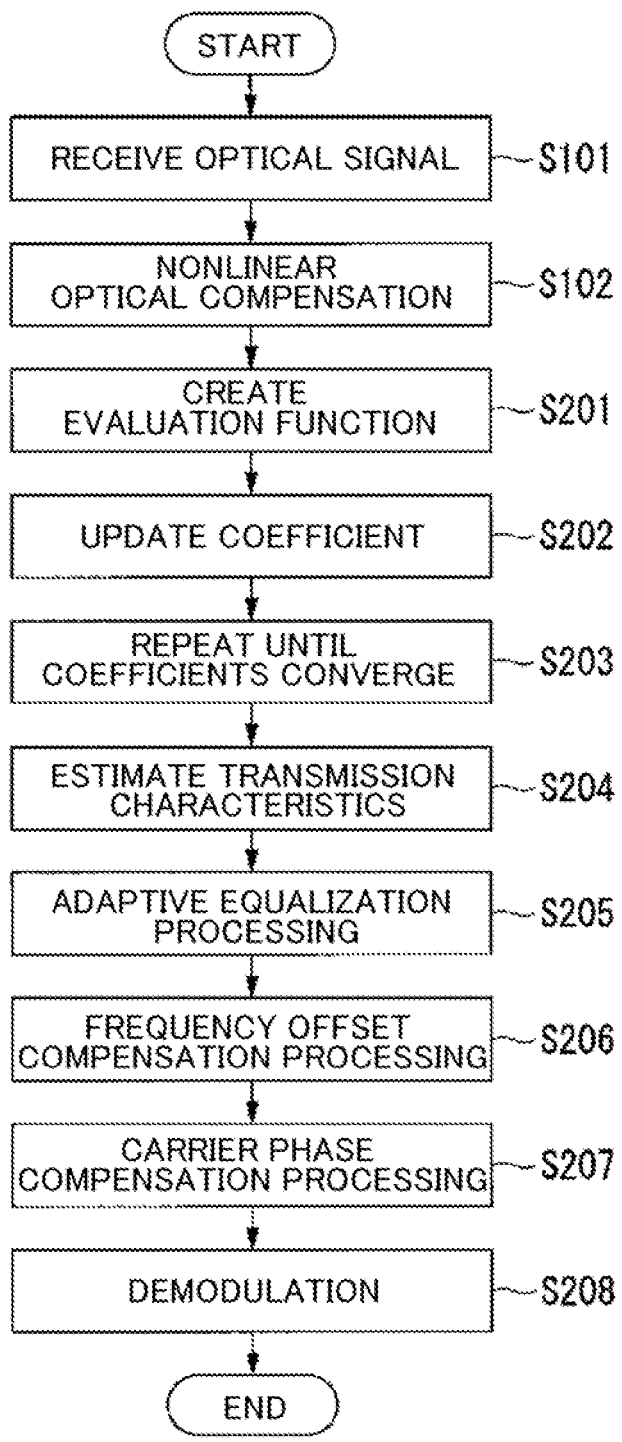
FIG. 8 is a flowchart showing the procedure of signal compensation processing by an optical reception device in the second embodiment.

FIG. 8 is a flowchart showing the procedure of signal compensation processing performed by the optical reception device 2a in the second embodiment. In FIG. 8, the same processing as that in FIG. 4 is designated by the same reference numeral as that in FIG. 4, and the description thereof will be omitted.

When processing in Step S102 is executed the number of times corresponding to N steps, the coefficient update section 28a compares the output signal output from the inverse Fourier transform section 235 with the training signal, and creates a predetermined evaluation function (Step S201). In the second embodiment, unlike the first embodiment, it is not possible to use the transmission signal as the training signal without altering the transmission signal. In this case, the optical reception device 2a needs to create the training signal which is the correct signal having been subjected to the digital back propagation, and it is possible to create the correct signal by imparting the carrier phase noise determined by estimation, the frequency offset, and inverse characteristics of an adaptive equalization filter to the transmission signal sequentially.

Next, the coefficient update section 28a updates all coefficients (e.g., the dispersion coefficients $\beta_k$, the phase rotation amounts $\phi_k$, and the like) used in the nonlinear optical compensation section 23 by using the optimization algorithm so as to minimize the created evaluation function (Step S202). The update of the coefficient using the optimization algorithm is the same as that in the first embodiment. The coefficient update section 28a sets the coefficients obtained by Formula (2) described above in the nonlinear optical compensation section 23. Thereafter, the optical reception device 2a repeatedly executes the processing in Steps S101 to S202 by using the newly set coefficients until the coefficients converge (Step S203).

When the coefficients converge, the coefficient update section 28a outputs the output signal obtained by using the optimized coefficients to the adaptive equalization section 24. On the other hand, the transmission characteristic estimation section 29 obtains all of the optimized coefficients (e.g., the dispersion coefficients $\beta_k$, the phase rotation amounts $\phi_k$, and the like). For example, the transmission characteristic estimation section 29 may obtain all of the optimized coefficients (e.g., the dispersion coefficients $\beta_k$, the phase rotation amounts $\phi_k$, and the like) from the nonlinear optical compensation section 23, or may also obtain them directly from the coefficient update section 28. The transmission characteristic estimation section 29 estimates transmission characteristics by using all of the obtained optimized coefficients (e.g., the dispersion coefficients $\beta_k$, the phase rotation amounts $\phi_k$, and the like) (Step S204). The transmission characteristic estimation section 29 outputs estimation results to the estimation result output section 30. The estimation result output section 30 outputs the estimation results (the loss distribution and the dispersion distribution) output from the transmission characteristic estimation section 29 to the outside.

The adaptive equalization section 24 performs adaptive equalization which compensates for the distortion generated in the waveform of the output signal output from the coefficient update section 28a (Step S205). The adaptive equalization section 24 outputs the signal having been subjected to the adaptive equalization processing to the frequency offset compensation section 25.

The frequency offset compensation section 25 executes the frequency offset compensation processing for compensating for the frequency offset on the signal output from the adaptive equalization section 24 (Step S206). The frequency offset compensation section 25 outputs the signal having been subjected to the frequency offset compensation processing to the carrier phase noise compensation section 26. The carrier phase noise compensation section 26 executes the carrier phase compensation processing for compensating for the phase offset on the digital signal of which the frequency offset has been subjected to the compensation (Step S207). The carrier phase noise compensation section 26 outputs the signal having been subjected to the carrier phase compensation processing to the demodulation section 27. The demodulation section 27 performs the demodulation and the decoding on the digital signal output from the carrier phase noise compensation section 26 to thereby obtain the demodulation signal (Step S208). The demodulation section 27 outputs the obtained demodulation signal to the subsequent stage.

According to the thus configured optical reception device 2a, similarly to the first embodiment, it is possible to easily estimate optical transmission characteristics.

In addition, the optical reception device 2a performs the comparison between the received signal and the training signal immediately after the digital back propagation. With this, a feedback loop for update is small and it is possible to make the speed of learning higher than that in the first embodiment.

FIGS. 9A and 9B are views showing results of a simulation performed by using the optical reception device 2 in the present invention. FIG. 9A is a view showing the simulation result in the case where a failure point is not present, and FIG. 9B is a view showing the simulation result in the case where the failure point is present (e.g., 50 km).

As conditions of the simulation, the length of the optical transmission line 3 was set to 200 km, the number of spans was set to 2, the number of steps of the digital back propagation was set to 40, and an exp barrier was used as the regularization term. As shown in FIG. 9A, it can be seen that the nonlinear optical compensation is performed with high accuracy in the case where the failure point is not present.

<Modification Common to First Embodiment and Second Embodiment>

The coefficient update section 28 or 28a may perform the comparison between the output signal and the training signal at another location. Specifically, the optical reception device 2 or 2a may perform the comparison between the output signal and the training signal between the adaptive equalization section 24 and the frequency offset compensation section 25, between the frequency offset compensation section 25 and the carrier phase noise compensation section 26, or between the carrier phase noise compensation section 26 and the demodulation section 27. Note that, in the case where the comparison between the output signal and the training signal is performed between the carrier phase noise compensation section 26 and the demodulation section 27 in the first embodiment, the digital signal processing section 22 needs to newly include the demodulation section 27.

The transmission characteristic estimation section 29 may perform the estimation of transmission characteristics at other places. Specifically, the transmission characteristic estimation section 29 may perform the estimation of transmission characteristics after the processing of the adaptive equalization section 24, may perform the estimation thereof after the processing of the frequency offset compensation section 25, and may perform the estimation thereof after the processing of the carrier phase noise compensation section 26.

While each embodiment has described the configuration in which the optimization of the parameter is performed when the system is constructed, the optical reception device 2 or 2a may also be configured so as to perform the optimization of the parameter during the actual operation of the system. In the case where the optical reception device 2 or 2a is configured in the above manner, it is conceivable to use a method in which the optical reception device 2 or 2a perform coefficient update on a reception side by using a pilot signal as the correct signal in which the known pilot signal is mixed into a series of transmission signals between the optical transmission device 1 and the optical reception device 2 or 2a.

With this, it becomes possible to maintain or improve compensation accuracy during the operation.

The estimation of transmission characteristics may be performed with online processing by physically creating the received signal in a chip which constitutes the digital signal processing section 22 in the optical reception device 2, or may also be performed with offline processing by fetching the received signal from the optical reception device 2. In the case where the estimation of transmission characteristics is performed with the offline processing, all of the functional sections provided in the digital signal processing section 22 are provided in an external device such as an external computer. The external device obtains a signal immediately before entering the nonlinear optical compensation section 23, and performs processing similar to the processing shown in each embodiment described above.

Each of the optical reception devices 2 and 2a described above may be implemented by a computer. In this case, each of the optical reception devices 2 and 2a may be implemented by recording a program for implementing the function in a computer-readable recording medium, causing a computer system to read the program recorded in the recording medium, and executing the program. "The computer system" mentioned herein is assumed to include an OS and hardware such as peripheral equipment. In addition, "the computer-readable recording medium" denotes a portable medium such as a flexible disk, a magneto-optical disk, a ROM, or a CD-ROM, or a storage device such as a hard disk included in a computer system. Further, "the computer-readable recording medium" may include a medium which dynamically retains a program for a short period of time such as a communication line in the case where the program is transmitted via a network such as the Internet or a telecommunication line such as a phone line, and a medium which retains the program for a predetermined period of time such as a volatile memory in a server or a computer system serving as a client in the above case. In addition, the program mentioned above may be a program for implementing part of the above-described function, a program which can implement the above-described function in combination with a program which is already recorded in a computer system, or a program which is implemented by using a programmable logic device such as an FPGA (Field Programmable Gate Array).

Although the embodiments of the present invention have been described in detail with reference to the drawings, its specific configuration is not limited to the embodiments, and design within a scope which does not depart from the gist of the present invention is included in the claims.

INDUSTRIAL APPLICABILITY

The present invention can be applied to the optical transmission system which performs the nonlinear optical compensation.

REFERENCE SIGNS LIST

1 Optical transmission device
2, 2a Optical reception device
21 Coherent receiver
22, 22a Digital signal processing section
23 Nonlinear optical compensation section
24 Adaptive equalization section
25 Frequency offset compensation section
26 Carrier phase noise compensation section
27 Demodulation section
28, 28a Coefficient update section
29 Transmission characteristic estimation section
30 Estimation result output section
231-1 to 231-N Linear compensation section
232-1 to 232-N Nonlinear compensation section
233-1 to 233-N Fourier transform section
234-1 to 234-N Wavelength dispersion compensation section
235-1 to 235-N Inverse Fourier transform section

The invention claimed is:

1. An optical reception device comprising:
a coefficient update section which optimizes a dispersion coefficient used in compensation of wavelength dispersion of a received signal obtained by receiving an optical signal according to a coherent detection method and a phase rotation amount used in compensation of a nonlinear optical effect of the received signal; and
a transmission characteristic estimation section which estimates a transmission characteristic of a transmission line by using the optimized dispersion coefficient and the optimized phase rotation amount.

2. The optical reception device according to claim 1, wherein the coefficient update section optimizes each of a plurality of the phase rotation amounts used in the compensation of the nonlinear optical effect which is repeatedly executed an N (N is an integer of at least 1) step(s) such that an evaluation function of the received signal is not less than a predetermined threshold value.

3. The optical reception device according to claim 1, wherein the coefficient update section optimizes each of a plurality of the dispersion coefficients used in the compensation of the wavelength dispersion which is repeatedly executed an N step(s) such that the evaluation function of the received signal is not less than a predetermined threshold value.

4. The optical reception device according to claim 1, wherein the coefficient update section creates an evaluation function by comparing a signal having been subjected to the compensation of the wavelength dispersion and the compensation of the nonlinear optical effect with a training signal, and updates the dispersion coefficient and the phase rotation amount so as to minimize the evaluation function.

5. The optical reception device according to claim 4, wherein the coefficient update section creates, as the evaluation function, a residual sum of squares or an evaluation function in which a predetermined regularization term is added to the residual sum of squares.

6. The optical reception device according to claim 4, wherein the coefficient update section uses, as the training signal, a transmission signal transmitted by an optical transmitter or a signal generated by imparting a carrier phase noise, a frequency offset, and an inverse characteristic of an adaptive equalization filter to the transmission signal transmitted by the optical transmitter.

7. The optical reception device according to claim 1, wherein the coefficient update section uses a method in which the plurality of the dispersion coefficients and the plurality of the phase rotation amounts are optimized one by one, or gradient descent as an algorithm which optimizes the dispersion coefficient and the phase rotation amount.

8. A transmission characteristic estimation method comprising:
a coefficient update step of optimizing a dispersion coefficient used in compensation of wavelength dispersion of a received signal obtained by receiving an optical signal according to a coherent detection method and a phase rotation amount used in compensation of a nonlinear optical effect of the received signal; and
a transmission characteristic estimation step of estimating a transmission characteristic of a transmission line by using the optimized dispersion coefficient and the optimized phase rotation amount.

* * * * *